(12) United States Patent
Cypher et al.

(10) Patent No.: US 7,181,674 B2
(45) Date of Patent: Feb. 20, 2007

(54) COMPUTER SYSTEM INCLUDING A NETWORK EMPLOYING REDUNDANT INFORMATION AND SLICING

(75) Inventors: Robert E. Cypher, Saratoga, CA (US); Andrew Phelps, Encinitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 676 days.

(21) Appl. No.: 10/385,355

(22) Filed: Mar. 10, 2003

(65) Prior Publication Data

US 2004/0003339 A1 Jan. 1, 2004

Related U.S. Application Data

(60) Provisional application No. 60/392,568, filed on Jun. 28, 2002.

(51) Int. Cl.
*H03M 13/00* (2006.01)
(52) U.S. Cl. .................. 714/776; 714/758; 709/230; 709/231; 709/104; 709/205; 370/392
(58) Field of Classification Search ............. 714/758, 714/776; 709/104, 205; 370/392
See application file for complete search history.

(56) References Cited

U.S. PATENT DOCUMENTS

| 4,633,472 | A | 12/1986 | Krol |
| 5,463,644 | A | 10/1995 | Rodi et al. |
| 5,685,005 | A * | 11/1997 | Garde et al. ............... 712/36 |
| 5,774,482 | A | 6/1998 | Grewal |
| 6,307,860 | B1 * | 10/2001 | Joffe et al. ............... 370/412 |
| 6,334,168 | B1 | 12/2001 | Islam et al. |
| 6,473,880 | B1 | 10/2002 | Cypher |
| 6,513,093 | B1 | 1/2003 | Chen et al. |
| 6,745,284 | B1 | 6/2004 | Lee et al. |
| 2003/0016624 | A1 * | 1/2003 | Bare ....................... 370/217 |
| 2003/0028662 | A1 * | 2/2003 | Rowley et al. ............ 709/231 |
| 2004/0003336 | A1 | 1/2004 | Cypher |

OTHER PUBLICATIONS

Nicholson, J.O.: "The RISC System/6000 SMP System", *Digest of Papers of the Computer Society Computer Conference (Spring) Compcon. Technologies for the Information Superhighway*, San Francisco, CA, Mar. 5 9, 1995, Los Alamitos, IEEE Comp. Soc. Press, US, vol. Conf. 40, Mar. 5, 1995, pp. 102-109, XP000545420, ISBN: 0-7803-2657-1, p. 103-106.

(Continued)

*Primary Examiner*—Guy J. Lamarre
(74) *Attorney, Agent, or Firm*—Meyertons Hood Kivlin Kowert & Goetzel, P.C.; B. Noël Kivlin (57) ABSTRACT

A computer system may include a client subsystem, another client subsystem, and a network coupled to the client subsystems. The network includes several network slices. One of the client subsystems is configured to convey a packet to the other client subsystem by conveying each of several slices of the packet on a respective one of the network slices. The client subsystem also conveys redundant information associated with the packet on at least one additional network slice. The redundant data is usable to regenerate at least one of the slices of the packet.

29 Claims, 7 Drawing Sheets

OTHER PUBLICATIONS

Anonymous: "Sun Enterprise 10000 Server—Technical White Paper", Internet Article, Online! XP00225456 Retrieved from the Internet: <:http://www.sun.com/servers/white-papers/e10000. pdf?rendition=pdf>, retrieved on Sep. 15, 2003, p. 11, lines 1-18.

Maenner R, et al: "Entwurf Und Realisation Des Schnellen, Flexiblen Und Fehlertoleranten Polyprozessors Heidelberger Polyp. Design and Realization of the Fast, Flexible and Fault-Tolerant Polyprocessor Heidelberg Polyp", Elektronische Rechenanlagen, Oldenbourg Verlag. Munchen, DE, vol. 24, No. 4, Aug. 1, 1982, pp. 157-175, XP000718855.

International search report application No. PCT/US03/16673 mailed Sep. 30, 2003.

Patterson, David A. et al; "A Case for Redundant Arrays of Inexpensive Disks (RAID)"; Computer Science Division Department of Electrical Engineering and Computer Sciences, University of California at Berkeley, 1998.

Mogi, K, et al; "Dynamic Parity Stripe Reorganizations for RAID5 Disk Arrays"; Institute of Industrial Science, University of Tokyo, 1994.

Mogi, K, et al; "Virtual Striping: A Storage Management Scheme with Dynamic Striping"; IEICE Trans Inf & Syst., vol. E79D. No. 8 Aug. 1996.

* cited by examiner

| RoutingPrefix[0][x]: | 0 | 1 | 2 | 3 | 4 | 5 | 6 | 7 | 8 | 9 | 10 | 11 |
|---|---|---|---|---|---|---|---|---|---|---|---|---|
| Contents: | ADD0 | ADD1 | ADD2 | ADD3 | ADD4 | ADD5 | ADD6 | ADD7 | ADD8 | APT0 | APT1 | APT2 |

| RoutingPrefix[1][x]: | 0 | 1 | 2 | 3 | 4 | 5 | 6 | 7 | 8 | 9 | 10 | 11 |
|---|---|---|---|---|---|---|---|---|---|---|---|---|
| Contents: | ECC0 | ECC1 | ECC2 | ECC3 | ECC4 | ECC5 | ECC6 | ECC7 | ECC8 | ECC9 | FCC0 | FCC1 |

FIG. 4D

| RoutingPrefix[0][x]: | 0 | 1 | 2 | 3 | 4 | 5 | 6 | 7 | 8 | 9 | 10 | 11 |
|---|---|---|---|---|---|---|---|---|---|---|---|---|
| Contents: | D-D0 | D-D1 | D-D2 | D-D3 | D-D4 | D-D5 | D-D6 | D-D7 | D-D8 | APT0 | APT1 | APT2 |

| RoutingPrefix[1][x]: | 0 | 1 | 2 | 3 | 4 | 5 | 6 | 7 | 8 | 9 | 10 | 11 |
|---|---|---|---|---|---|---|---|---|---|---|---|---|
| Contents: | ECC0 | ECC1 | ECC2 | ECC3 | ECC4 | ECC5 | ECC6 | ECC7 | ECC8 | ECC9 | FCC0 | FCC1 |

COMPUTER SYSTEM INCLUDING A NETWORK EMPLOYING REDUNDANT INFORMATION AND SLICING

CROSS-REFERENCE TO RELATED APPLICATIONS

This application claims the benefit of U.S. Provisional Application No. 60/392,568, filed Jun. 28, 2002, titled "A Computer System Including a Network Employing Error Detection and Slicing."

BACKGROUND

1. Field of the Invention

This invention relates to computer system reliability and, more particularly, to the detection and correction of errors in packets transmitted within a computer system.

2. Description of the Related Art

Error codes are commonly used in electronic systems to detect and correct errors such as transmission errors or storage errors. For example, error codes may be used to detect and correct errors in information transmitted via a communication link within a computer system. Error codes may additionally be used to detect and correct errors associated with information stored in the memory or mass storage devices of computer systems. One common use of error codes is to detect and correct errors in information transmitted on a bus within a computer system. In such systems, error correction bits, or check bits, may be generated for data prior to its transfer or storage. The check bits may then be transmitted or stored with the data. When the data is received or retrieved, the check bits may be used to detect and/or correct errors within the data. The use of error codes within a computer system may increase the reliability of that system by detecting errors as soon as they occur. Similarly, the use of error codes may improve system availability by allowing the system to continue to function despite one or more failures.

Errors in transmitted or stored information may be caused by transient conditions such as cross talk or noise encountered within a system. Component failures are another common source of error in electrical systems. Faulty components may include faulty memory chips or faulty data paths provided between devices of a system. For example, faulty data paths may result from faulty pins, faulty data traces, or faulty wires.

Hamming codes are one example of commonly used error codes. The check bits in a Hamming code may each provide the parity for a unique subset of the bits to be protected. If an error occurs (i.e., one or more of the bits unintentionally change state), one or more of the check bits will also change state upon regeneration (assuming the error is within the class of errors covered by the code). By determining which of the regenerated check bits changed state, the location of the error may be determined. For example, if one bit changes state, this bit will cause one or more of the regenerated check bits to change state. Based on which of the check bits change state, the erroneous bit may be identified and the error may be corrected by inverting the erroneous bit.

SUMMARY

Various embodiments of a computer system that includes a network employing error detection and slicing are disclosed. In one embodiment, a computer system includes a client subsystem, another client subsystem, and a network coupled to the client subsystems. The network includes several network slices. One of the client subsystems is configured to convey a packet to the other client subsystem by conveying each of several slices of the packet on a respective one of the network slices. The client subsystem also conveys redundant information associated with the packet on at least one additional network slice. The redundant data is usable to regenerate at least one of the slices of the packet.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Figure 1:
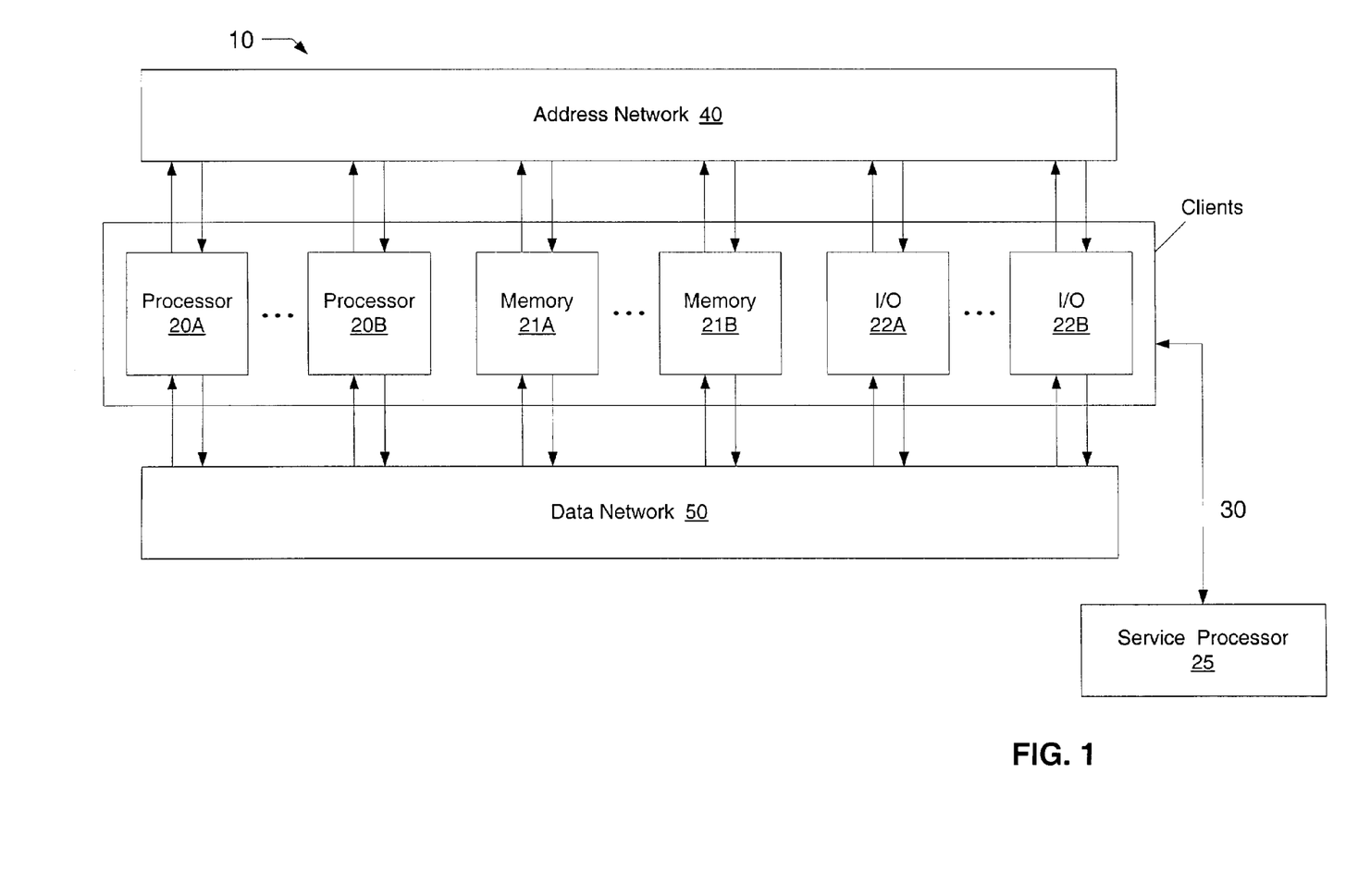
FIG. 1 is a block diagram of a computer system, according to one embodiment.

FIG. 1 shows a block diagram of one embodiment of a computer system 10. Computer system 10 includes multiple devices interconnected through an address network 40 and a data network 50. The devices include processor devices 20A and 20B, memory devices 21A and 21B, and I/O devices 22A and 22B. Each of the devices is referred to herein as a client device or client subsystem. In some embodiments, each of the client devices may be coupled to a diagnostic or service processor 25 via an independent communication medium 30 (e.g., communication medium 30 may include separate signal lines coupling each client to the service processor 25 in one embodiment).

It is noted that embodiments of computer system 10 employing any number of clients and different combinations of client types may be implemented. Elements referred to herein with a particular reference number followed by a letter may be collectively referred to by the reference number alone. For example, processor devices 20A–20B may be collectively referred to as processor devices 20. Note that the embodiment shown in FIG. 1 is a logical representation of computer system 10 and that the physical implementation of computer system 10 may appear significantly different. Note also that in some embodiments, certain clients devices may include multiple types of functionality. For example, in an alternative embodiment, one client device may implement both processor and memory device functionality while another client device may implement processor, memory, and/or I/O functionality.

Each of processor devices 20 and I/O devices 22 may access each of memory devices 21. Devices such as these that are configured to perform accesses to memory devices 21 are referred to herein as "active" devices. Each client device in FIG. 1 may be configured to convey address messages on address network 40 and data messages on data network 50 using split-transaction packets. Each processor device 20 in the illustrated embodiment may include a processor (not shown). Processor devices 20 may also include one or more instruction and data caches (not shown) that may be configured in any of a variety of specific cache arrangements. For example, set-associative or direct-mapped configurations may be employed by the caches within processor devices 20.

Memory devices 21 are configured to store data and instruction code for use by processor devices 20 and I/O devices 22. Memory devices 21 preferably include dynamic random access memory (DRAM) components, although other types of memory components may be used. The memory within memory devices 21 may be implemented using memory modules (e.g., dual in-line memory modules (DIMMs), Rambus in-line memory modules (RIMMs), or single in-line memory modules (SIMMs)). Each address may map to a particular memory device, which is referred to herein as the home device or subsystem of that address.

I/O devices 22 may each be illustrative of a peripheral device such as an input-output bridge, a graphics device, a networking device, etc. In various embodiments, one or more of the I/O devices 22 may include a cache memory subsystem similar to those of processor devices 20 for caching data associated with addresses mapped within one of the memory subsystems. Some addresses may also be mapped to I/O devices 22.

In one embodiment, data network 50 may be a logical point-to-point network. Data network 50 may be implemented as an electrical bus, a circuit-switched network, or a packet-switched network. In embodiments where data network 50 is a packet-switched network, packets may be sent through the data network using switching techniques such as wormhole, store and forward, and virtual cut-through. In a circuit-switched network, a particular client device may communicate directly with a second client device via a dedicated point-to-point link that may be established through a switched interconnect mechanism. To communicate with a third client device, the particular client device utilizes a different link, established by the switched interconnect mechanism, than the one used to communicate with the second client device. In one embodiment, data network 50 may implement a source-destination ordering property such that if a client device C1 sends a data message D1 before sending a data message D2 and a client device C2 receives both D1 and D2, C2 will receive D1 before C2 receives D2.

Address network 40 accommodates communication between processing devices 20, memory devices 21, and I/O devices 22. Like data network 50, address network 40 may be implemented as an electrical bus, a circuit-switched network, or a packet-switched network. Address network 40 and/or data network 50 may be implemented using a multistage switching hierarchy in some embodiments. Depending on the embodiment, address network 40 may be implemented in hardware that is separate from data network 50 or in hardware that is shared with data network 50.

Messages upon address network 40 are generally referred to as address packets. When an address packet references a storage location within a memory device 21, the referenced location may be specified via an address conveyed within the address packet upon address network 40. Subsequently, data corresponding to the address packet on the address network 40 may be conveyed upon data network 50. Typical address packets correspond to requests for an access right (e.g., read or write access) corresponding to a cacheable memory location or requests to perform a read or write to a non-cacheable memory location.

In one embodiment, address network 40 may implement a broadcast network in which each address packet is conveyed to all client devices coupled to the address network. In alternative embodiments, the address network may not broadcast all address packets (e.g., some address packets may conveyed to fewer than all of the client devices). In alternative embodiments, address network 40 may be implemented using a common bus structure.

In some embodiments, address network 40 may be configured to transmit coherence requests corresponding to read or write memory operations using a point-to-point transmission mode. For coherence requests that are conveyed point-to-point by address network 40, a directory-based coherency protocol may be implemented. In other embodiments, address network 40 may be configured to transmit coherence requests in broadcast mode, and a snooping broadcast coherency protocol may be implemented. In still other embodiments, address network 40 may be configured to selectively transmit coherence requests in either point-to-point mode or broadcast mode. In such embodiments, both snooping broadcast coherency protocols and directory-based coherency protocols may be implemented.

In embodiments supporting both point-to-point and broadcast transmission modes, clients transmitting a coherence request to address network 40 may be unaware of whether the coherence request will be conveyed within computer system 10 via a broadcast or a point-to-point mode transmission. In such an embodiment, address network 40 may be configured to determine whether a particular coherence request is to be conveyed in broadcast (BC) mode or point-to-point (PTP) mode. For example, one embodiment of address network 40 may includes a table for classifying coherence requests as either BC mode or PTP mode dependent on a memory address specified in the coherence request.

Network Slicing

Address network 40 and/or data network 50 may each be implemented as multiple parallel pieces that are each at least two bits wide. Each piece is referred to herein as a "slice." Each slice of address network 40 may convey a portion of an address packet. The address network 40 slices may each convey a respective portion of the same address packet at the same time. Similarly, each slice of data network 50 may convey a portion of a data packet. In some embodiments, the slices of each network may be implemented as independent communication links such that the failure of one slice will not affect the operability of any other slice. The portion of a packet conveyed on a single network slice is referred to herein as a packet slice.

Each packet may include redundant information, such as parity information, that protects the information included in the remainder of the packet (e.g., the packet body and/or header). One or more slices of address network 40 and one or more slices of data network 50 may be used to convey the redundant information that corresponds to portions of the packet that are being conveyed on the other network slices. The network slices that convey redundant information for each packet may not convey portions of the body of an address or data packet in some embodiments. The redundant information may be useable to regenerate at least one of the portions of the packet conveyed on the other slices. For example, the redundant information may include parity information generated from each of the packet's packet slices. If one packet slice is lost (e.g., due to failure of the sending device or failure of one of the network slices), a receiving device may regenerate that packet slice from the parity information and the remaining packet slices. In other embodiments, the redundant information may include a duplicate copy of one or more of the associated packet slices.

Figure 2:
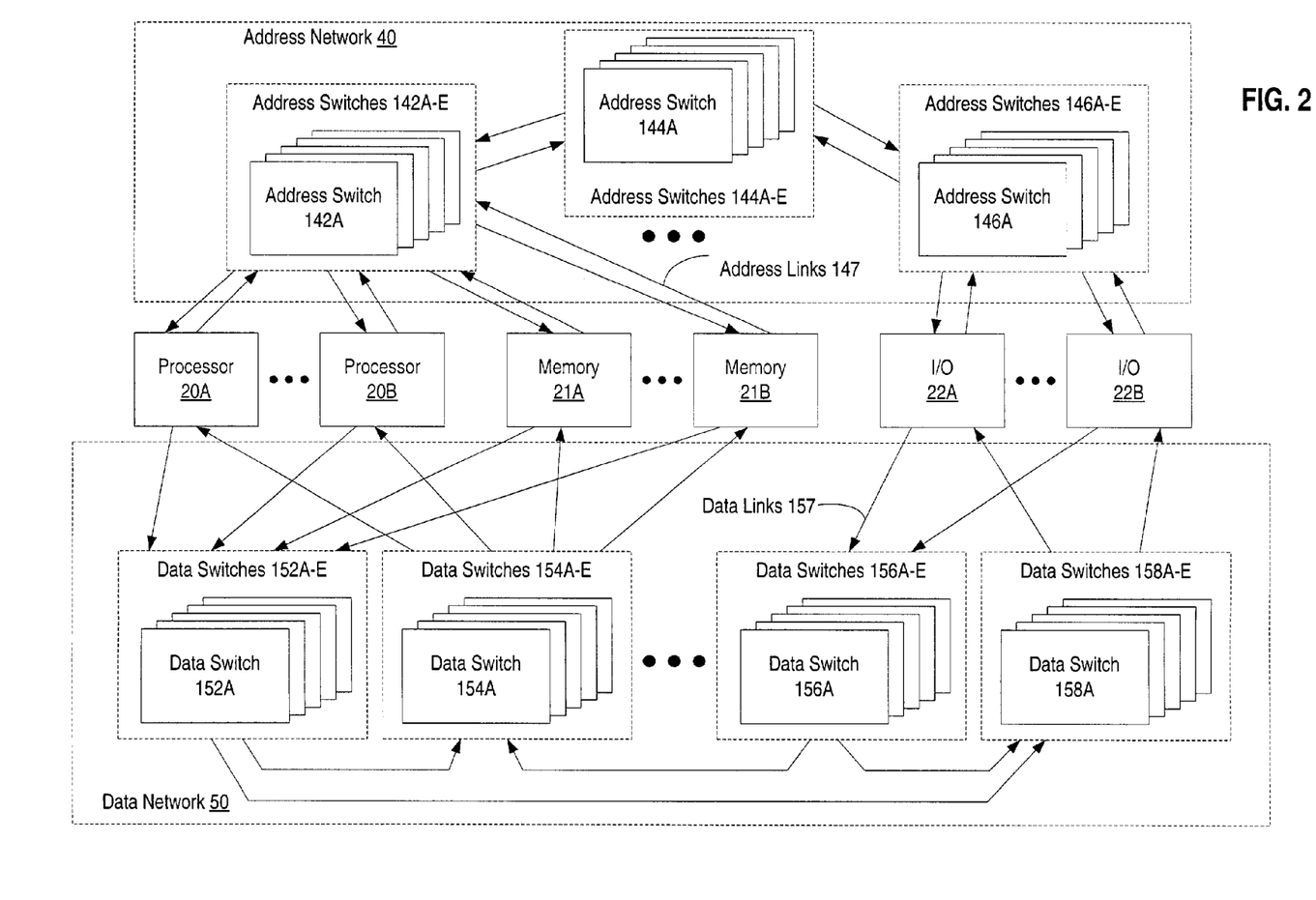
FIG. 2 is another diagram of a computer system, according to one embodiment.

FIG. 2 shows a block diagram of another embodiment of computer system 10. Like the embodiment of FIG. 1, computer system 10 of FIG. 2 includes multiple clients interconnected through an address network 40 and a data network 50. In the illustrated embodiment, address network 40 is implemented as a multi-stage packet-switched network and data network 50 is implemented as a two-stage packet-switched network. Each network includes several network switches. Clients may include processor clients 20A–20B, memory clients 21A–21B, and I/O clients 22A–22B, as shown in FIG. 2. It is noted that although only two clients from each category are shown in the illustrated embodiment, other embodiments may include different numbers and/or types of clients. Additionally, in alternative embodiments, single-stage address and/or data networks and/or point-to-point links directly coupling client devices (e.g., by coupling each memory device 21 to each other client device) may be used to implement address network 40 and/or data network 50.

In FIG. 2, address network 40 includes (at least) three groups of address switches, labeled 142A–E, 144A–E and 146A–E. Each address switch (e.g., address switch 142A) may be implemented in one or more integrated circuits, each containing many individual switches and circuits. In the illustrated embodiment, each address switch group 142, 144, and 146 includes five switches A–E. Each switch A–E is used to implement a respective slice of the five-slice address network. For example, address switch 142A may be used to communicate packet slices conveyed in address network slice 0, address switch 142B may communicate packet slices conveyed in address network slice 1, and so on. Each slice may be used to convey a different portion of an address packet. For example, slices 0–3 may be used to convey a respective portion of the body of the address packet, including a respective portion of error code (i.e., an error detecting and/or correcting code) in some embodiments. Slice 4 may be used to convey parity information or other redundant information associated with the address packet conveyed by the other slices 0–3. Note that in other embodiments, address network 40 may be broken up into other numbers of slices.

In the illustrated embodiment, data network 50 is also subdivided into five slices. Data network 50 includes (at least) four groups of data switches, labeled 152A–E, 154A–E, 156A–E, and 158A–E. Like an address switch, a data switch may be implemented as one or more integrated circuits, each containing many individual switches and circuits. In this embodiment, each data switch group includes five switches, and each switch is used to implement a respective one of the five data slices. For example, data switch 152A may be used to communicate data packet slices conveyed in slice 0, data switch 152B may be part of data network slice 1, and so on. Data switch 152E may be part of slice 4, which may be used to convey a portion of a data packet that includes redundant information associated with the data packet portions conveyed in slices 0–3. Slices 0–3 may each be used to convey respective portions of a data packet and, in some embodiments, error code information included in a particular data packet. It is noted that in other embodiments, data network 50 may include other numbers of slices. Note also that data network 50 and address network 40 may be subdivided into different numbers of slices in some embodiments.

Address links 147 are used to interconnect clients to address switches and address switches to other address switches. Similarly, data links 157 are used to interconnect clients to data switches and data switches to other data switches. Several address links 147 and data links 157 may each be respectively coupled to an address interface (not shown) and a data interface (not shown) on each client. An address interface may be unidirectional, point-to-point, and source-synchronous and may include an address-in port and/or an address-out port. A data interface may also be unidirectional, point-to-point, and source-synchronous and may include a data-in port and a data-out port.

In one embodiment, each address-in port of a client may be either a five- or a ten-link port depending on whether the port is configured as a "narrow" (5-link) or a "wide" (10-link) port. Each link may include 12 signal lines in one embodiment. In other embodiments, fewer or additional different port widths may be supported. In a five-slice address network, four narrow links may be used to implement a respective network slice. Alternatively, two wide links may be used to implement each address network slice. Note that other embodiments may include other numbers of links and/or other numbers of signal lines per link.

Figure 3:
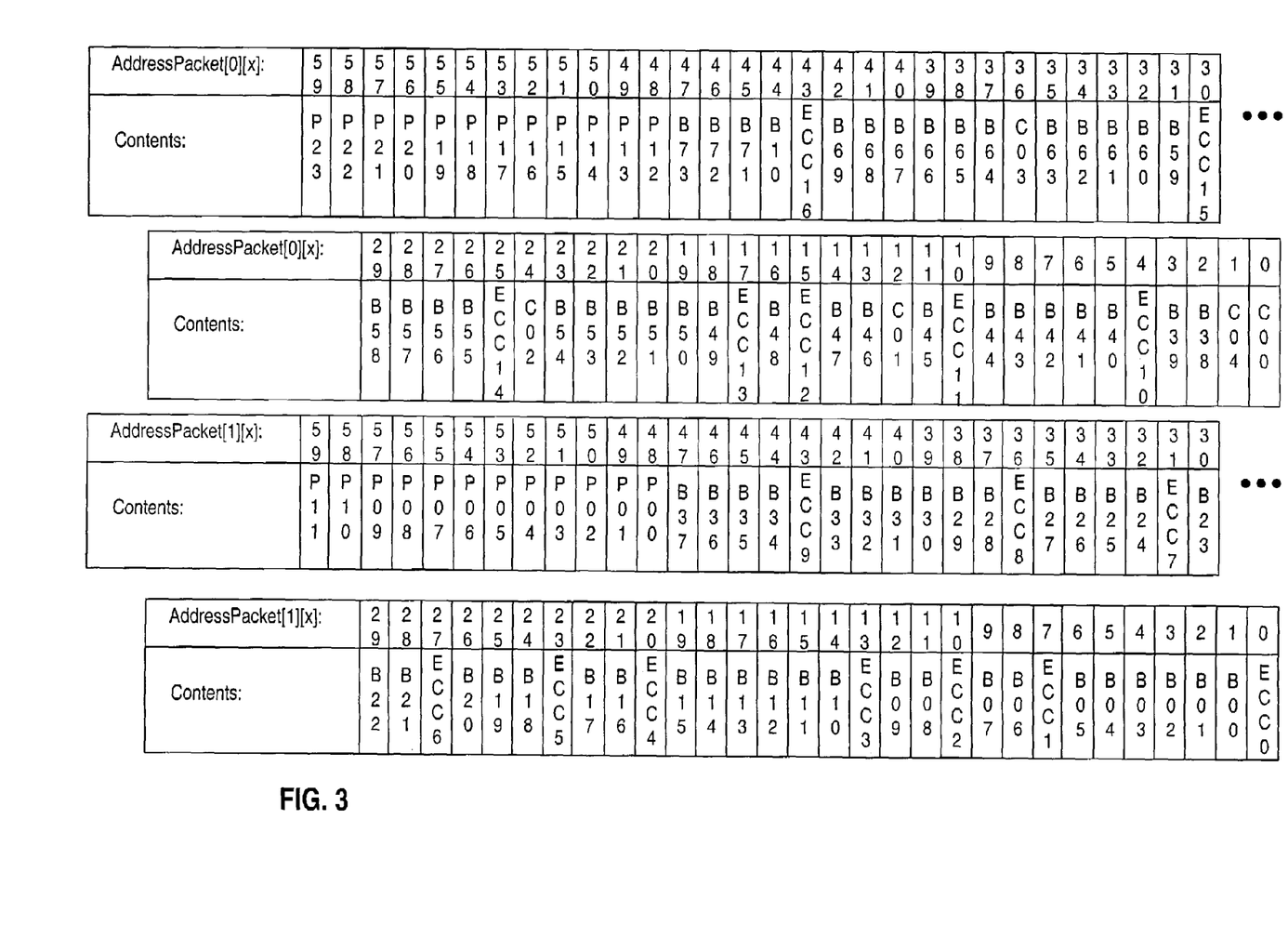
FIG. 3 is a diagram of an address packet, according to one embodiment.

FIG. 3 shows a diagram of an exemplary address packet, according to one embodiment. The illustrated address packet includes 120 bits and is shown in two sections of 60 bits each. The two sections of the address packet are respectively designated Address Packet [0] [59:0] and Address Packet [1] [59:0]. Collectively, the two portions are described as Address Packet [1:0] [59:0]. The various bits of each packet may be assigned to bit positions [0–59] within sections 0 and 1. Each section may be transferred over address links 147 during a different clock phase, or beat. Note that address packets of different sizes and numbers of subsections may be used in other embodiments.

An address packet includes an address body field. In the illustrated embodiment, the address body field includes 74 bits, labeled B0–B73. The address body field may include an address, a device identifier (e.g., identifying the device that initiated a transaction of which the current packet is a part), a packet identifier (e.g., identifying the transaction of which the current packet is a part), and a command encoding. Different command encodings may be used to request different types of access rights (e.g., read or write) to a particular coherency unit within a memory subsystem. Other command encodings may be used to request access to a non-cacheable data.

The illustrated address packet also includes a five-bit packet class field, labeled C0–C4. The packet class may identify whether the packet is a null or non-null packet. All bits in the address body field of a null packet may be zero in some embodiments.

An address packet may also include an error code field and/or a parity field. The illustrated address packet includes 17 error code bits, labeled ECC0–ECC16, and 24 parity bits, labeled P0–P23. It is noted that other embodiments may include packets having different fields and/or different numbers of bits within each field than those illustrated in FIG. 3. Additionally, some embodiments may include other types of redundant information instead of or in addition to parity information.

Assuming a five-slice address network as shown above, each section of the packet shown in FIG. 3 may be conveyed in five packet slices. For example, the first section Address Packet [0] [59:0] may be sliced: [59:48], [47:36], [35:24], [23:12], and [11:0]. Each packet slice may be sent on a different network slice. Accordingly, in this example, the parity bits P23–P12 from the first section and then P11–P0 from the second section are conveyed in a different network slice than the other packet bits of each section. The error code bits ECC0–ECC16 are intermingled with the other packet bits within each other packet slice in this example.

The parity bits included in each address packet may be calculated from other bits in the address packet using the using the exclusive-or (XOR) function. Thus, in this example, the parity bits may be calculated from the address body, packet class, and error code fields. In one embodiment, each parity bit may be calculated by XORing a bit from each of the other packet slices. For example, P23 may be calculated by XORing B73 (Address Packet [0] [47]), B63 (Address Packet [0] [35]), B54 (Address Packet [0] [23]and B45 (Address Packet [0] [11]). The parity check bits P0–P23 are redundant information bits that may be used to regenerate a slice of an address packet if one of the address network slices fails to correctly convey an address packet slices. One of the Boolean properties of the XOR function is that if A XOR B XOR C XOR D=E, then E XOR B XOR C XOR D=A. As a result, if A is lost or erroneous, it may be recreated using E, D, B and C. Accordingly, the bits within any one address packet slice may be recreated from the bits within the other slices and the parity bits.

The error code bits in each packet may include error detecting and/or error correcting code bits that may be used to detect and/or correct various classes of errors in the address body and packet class bits of the packet. For example, in one embodiment, the error code bits 0–16 may be used to detect double bit errors and correct single bit errors that occur within the packet. Various different types of error detection/correction codes, such as checksums, cyclic redundancy codes (CRC), Hamming codes, Reed-Solomon codes, etc., may be used to calculate the error code bits from the address body and packet class bits. In one embodiment, the error code may be implemented in accordance with that described in U.S. Pat. No. 6,453,440, titled "System and Method for Detecting Double-bit Errors and for Correcting Errors due to Component Failures," which is hereby incorporated by reference in its entirety as though completely and fully set forth herein.

Note that since the error code bits are calculated from the address body and packet class fields, the parity bits that depend on the error code bits may also be calculated directly from the address body and packet class fields. In other words, some embodiments may calculate the parity bits independently of the error code bits. This may allow the parity bits to be calculated in parallel with the error code bits. Other embodiments may instead calculate the parity bits whose values depend on certain error code bits from those error code bits.

Like address packets, data packets may include data body, packet class, error code, and parity (or other redundant information) fields. As with the address packet illustrated in FIG. 3, the parity bits or other redundant information for a data packet may be sent in a different slice of the data network than the other bits of the data packet. Thus, in the event of an error or failure in a given slice, the parity bits may be used in conjunction with the contents of the other slices to recreate the contents of the failed slice.

It is noted that in an alternative embodiment, more than one address or data network slice may be used to convey redundant information. In one such embodiment, each redundant packet slice may include redundant information for information contained in a subset of the other packet slices. For example, assuming a network has eight slices 0–7, packet slice 0 may include redundant information for packet slices 1–3 and packet slice 4 may include redundant information for packet slices 5–7. In such an embodiment, the redundant information may support the reconstruction of more than one lost or erroneous packet slice. For example, one slice within slices 0–3 and one slice within slices 5–7 may fail at the same time. Assuming no other slices are failed, both failed packet slices may be reconstructed. Techniques for detecting failed slices are described in more detail below.

Packet Transmission

Figure 4A:
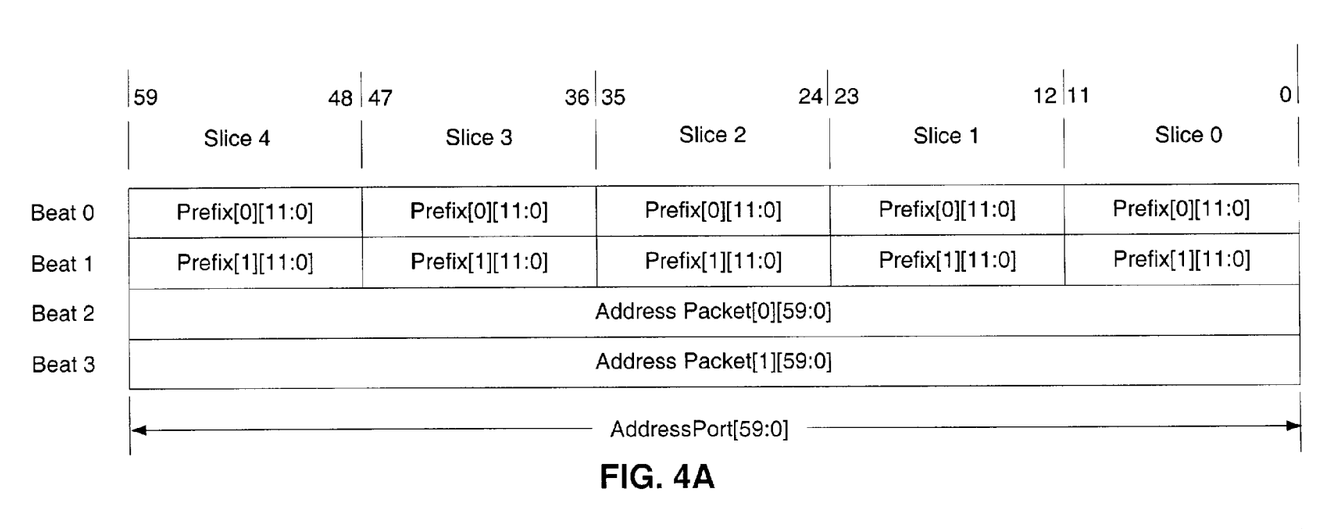
FIG. 4A illustrates how an address packet may be conveyed upon an address network in one embodiment.
Figure 4B:
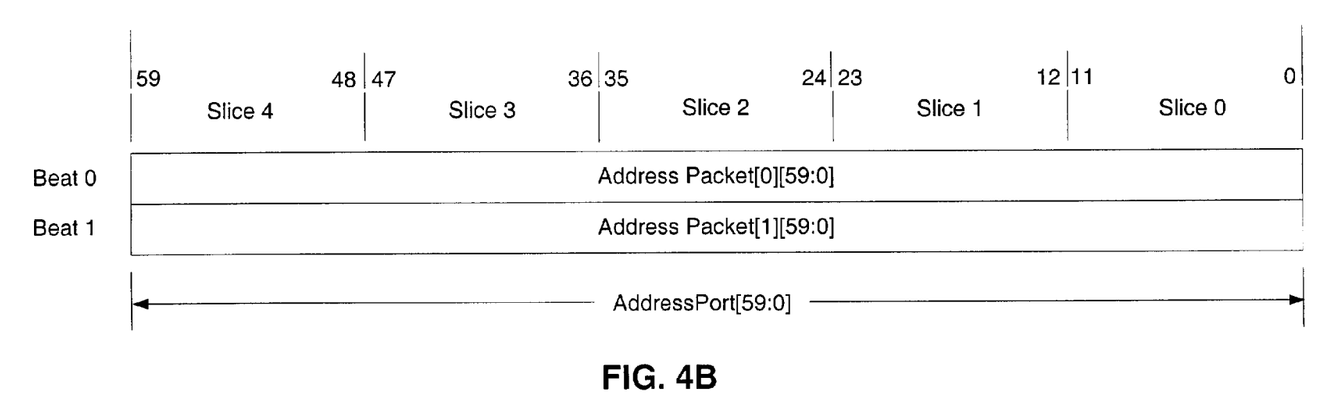
FIG. 4B shows how an address packet may be conveyed upon an address network in another embodiment.

FIG. 4A and FIG. 4B illustrate two examples of address packets that may be conveyed between clients and address switches. In these examples, an exemplary 120-bit wide address packet is shown. Depending on the size of the interface receiving the packet, the address packet may be sent using one or more clock phases, or beats. For example, fewer beats may be used to convey the address packet if the receiving interface is relatively wide than if the receiving interface is relatively narrow. In one embodiment, receiving interfaces may be sized so that a packet may be sent in two beats (e.g., if packets are 120 bits wide, each receiving interface may be 60 bits wide). Other embodiments may have interfaces sized to send and receive an entire packet in a single beat.

An address packet sent from a client to an address switch may be preceded by (or include) a routing prefix. Address switches may use this routing prefix to determine how an associated address packet should be conveyed. For example, if the routing prefix indicates the packet's destination client(s), an address switch may use that information to identify the address switch port(s) from which the packet should be output. If the routing prefix indicates a particular virtual channel in which the packet is being transmitted, that information may be used when arbitrating between various packets waiting to be routed by the address switch. Examples of information that may be included in a routing prefix include: all or part of an address being accessed, destination device identification, flow control information, and information identifying what type of address packet, if any, includes or follows the routing information. In some embodiments, the type of address packet may determine which virtual network, if any, that address packet is transmitted in. In embodiments that do not use address switches to route address packets, packets may not include or be preceded by routing information.

When networks are implemented in multiple slices, identical routing prefixes may be sent on each slice. For example, looking at FIG. 2, an address packet sent by processing subsystem 20A may be preceded by routing prefix information on all five address network slices. The five address switches 142A–E that receive the respective slices of the address packet from processing subsystem 20A may each receive the identical routing prefix information in the same beat. The address switch 142 in each address network slice may use the identical copy of the routing information received by that slice to determine how and when to route the accompanying address packet slice received by that address switch. For example, if the routing information indicates the target address of a coherency transaction initiated by the accompanying address packet, each address switch 142 may access a routing table to identify the memory subsystem 21 (or other destination device) to which the address packet slice should be routed. If the routing information identifies a particular virtual channel in which the accompanying address packet slices are being routed, each address switch 142 may use that information to determine when the accompanying address packet slice received by that switch should be routed relative to any other pending address packet slices. For example, if packets conveyed in one virtual channel have priority over packets in other virtual channel(s), each address switch may determine whether a respective packet slice should be conveyed ahead of another packet slice dependent on each packet slice's virtual channel.

Since each network switch in each slice receives the same routing prefix information, each network switch 142 may select a respective slice of the same packet for forwarding on a respective slice of the same network link during the same beat. For example, if a routing prefix for an address packet indicates that the address packet should be routed to memory 21B, address switches 142A–E may each select to output a respective slice of that address packet from an output port coupled to memory 21B. The routing prefix information may also provide each address switch 1 42A–E with information indicating the relative time at which a respective slice of that address packet should be output to memory subsystem 21B. Accordingly, each network switch 142A–E may output a respective slice of that address packet to memory subsystem 21 B during the same beat(s). Stated another way, the use of identical routing prefixes on each network slice may allow network slices to remain synchronized such that slices of the same packet are conveyed during the same beat(s).

An address packet sent from an address switch to a client may not include a routing prefix. Address switches may be configured to remove or otherwise inhibit the sending of the routing prefix to client devices when conveying the address packet to the destination client device(s). This may improve address network bandwidth in some embodiments.

FIG. 4A illustrates an address packet that may be conveyed from a client to an address switch in one embodiment. A routing prefix precedes the packet. Each beat, a portion of the address packet or several copies of a portion of the routing prefix are conveyed, in parallel, over five address network links. Each link includes 12 signal lines in this embodiment. As described above, the address packet may be divided into several slices with at least one of the slices conveying redundant information for the other slices. The illustrated embodiment shows how the various portions of the routing prefix and the address packet are divided into five slices. Each packet slice is conveyed over a corresponding 12-signal link.

In this particular embodiment, conveying the address packet and routing prefix takes four beats. During beat zero, an identical copy of the first half of the routing prefix is sent on all five slices. During beat one, an identical copy of the second half of the routing prefix is sent on all five slices. During beat two, the first half of the Address Packet [0][59:0] is sent. Different portions of the address packet are conveyed on each slice. Assuming the address packet is organized as shown in FIG. 3, the redundant information included in the first half of the address packet may be sent on slice 4. During beat three, the second half of the Address Packet [1][59:0] is sent. The redundant information included in the second half of the address packet may also be conveyed on slice 4. Thus, in the illustrated embodiment, slices 0–3 may convey address body, packet class, and error code bits, and slice 4 may convey the parity bits.

FIG. 4B shows an example of how an address packet may be conveyed from an address switch to a client in one embodiment. As mentioned above, in many embodiments, when an address packets is sent from an address switch to a client, the address packet may not be preceded by a routing prefix. FIG. 4B illustrates how the various portions of the address packet are divided into slices and sent across the address network. Each slice is conveyed over a corresponding 12-signal link. Since there is no routing prefix to send, the packet is sent over 2 beats. During beat zero, the first half of the address packet [0][59:0] is sent. During beat one, the second half of the address packet [1][59:0] is sent. As in FIG. 4A, slices 0–3 may convey address body, packet class, and error code bits, and slice 4 may convey the parity bits.

Figure 4C:
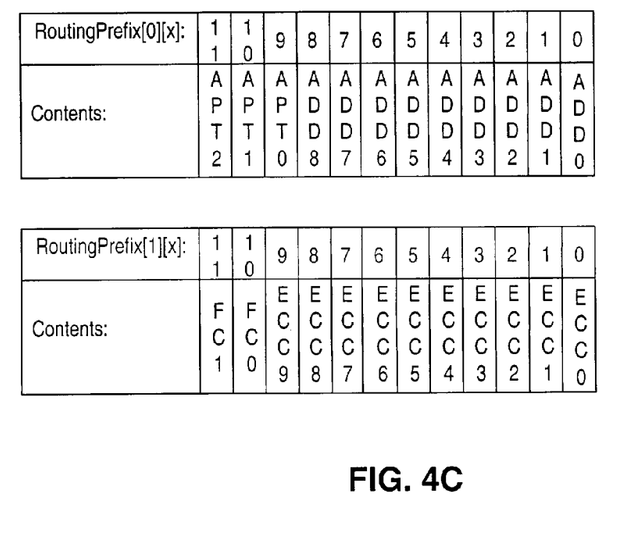
FIG. 4C illustrates an exemplary routing prefix that may be conveyed from a client device to a network switch, according to one embodiment.

FIG. 4C illustrates an exemplary routing prefix that may be generated by a client device when sending a packet on the address network. Here, the routing prefix is 12 bits wide and is sent over two beats. The routing prefix generated by the client device includes nine bits of address information ADD8–ADD0, included in RoutingPrefix [0][8:0]. The address bits may include portions of the address of the coherency unit for which an access right is being requested in the accompanying address packet. Also included are three bits of address prefix type information, APT2–APT0, included in RoutingPrefix [0][11:9]. The address prefix type information indicates the type (e.g., request, response, multicast) of the accompanying address packet. The address prefix type may be used by the address network to select the virtual channel through which the accompanying address packet should be routed. The routing prefix may also include two bits of flow control information, FC1–FC0, included in RoutingPrefix [1][11:10]. RoutingPrefix [1][11] may indicate whether the sending client device is requesting flow control on the broadcast, multicast, or response virtual networks. RoutingPrefix [1][10] may similarly indicate whether the sending client device is requesting flow control on the request virtual network. Finally, the routing prefix includes 10 bits of error code information, ECC9–ECC0, included in RoutingPrefix [1][9:0]. Note that other embodiments may include more or less information of each type in a routing prefix. Additionally, other embodiments may include different and/or additional information in a routing prefix.

In multi-stage address networks such as the one shown in FIG. 2, address switches may also modify the routing prefix when conveying the address packet to other address switches. For example, address switches 142 and 146 that receive address packets directly from client devices (i.e., without the packet being routed by any intermediate address switches) may be configured to reduce the amount of or otherwise modify routing information before conveying the address packet to subsequent address switches 144. In embodiments supporting multiple transmission modes (e.g., BC and PTP), client devices may send address packets on the address network with routing prefixes that include multiple bits of address information (e.g., identifying the coherency unit to which the accompanying packet requests access). Based on this address information, an address switch may access a lookup table to determine the transmission mode (e.g., BC or PTP) of the address packet. In some embodiments, the address switch may then encode the transmission mode as part of that address packet's routing prefix. The address switch may also remove or otherwise inhibit the sending of the address information when conveying the address packet to another address switch. For example, in one embodiment, the address switch may remove the address information by overwriting the address information with transmission mode information.

An address switch may also modify a routing prefix by encoding destination device ID into the routing prefix in embodiments implementing PTP mode address transactions (e.g., where PTP is implemented either as the only mode of conveyance or in addition to BC mode). For example, if address information encoded in a routing prefix indicates that the accompanying packet should be conveyed in PTP mode, each address switch receiving that routing prefix may encode information identifying the packet's destination(s) into the routing prefix. For example, the address switch may use the address information to locate the device ID of a memory subsystem that maps that address and encode at least a portion of the device ID into the routing information. In one embodiment, the address switch may overwrite the address information with the destination information. As an alternative to encoding all or part of a destination ID, the address switch may encode a destination mask having bit values representing each potential destination device and setting each bit that represents an actual destination of the accompanying packet to a particular value.

Figure 4D:
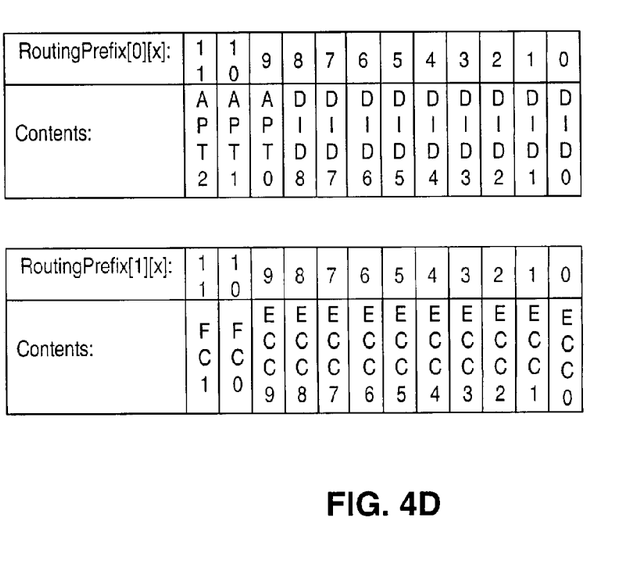
FIG. 4D shows an exemplary routing prefix that may be conveyed from a network switch to another network switch in one embodiment.

FIG. 4D illustrates an example of a modified routing prefix that may be generated by an address switch from the routing prefix shown in FIG. 4C in one embodiment. An address switch receiving the routing prefix of FIG. 4C may use the address information ADD8–ADD0 and/or address prefix type APT2–APT0 to identify the transmission mode (e.g., PTP or BC) in which the accompanying address packet should be conveyed. For example, in some embodiments, the transmission mode of an address packet may be determined by the address of the coherency unit specified in that address packet. An address switch may use the address information included in the routing prefix to access a routing table indicating the transmission mode associated with that address. Such a routing table may also indicate which memory subsystem maps that address in some embodiments.

If the routing table indicates that the accompanying address packet should be conveyed in PTP mode, an address switch may encode the device ID of the memory subsystem that maps the address indicated by address information ADD8–ADD0. This information may be encoded in place of ADD8–ADD0, as shown in FIG. 4D. Here, ADD8–ADD0 has been replaced with nine bits of device ID DID8–DID0 (included in RoutingPrefix [0][8:0]). In response to the routing table indicating that the accompanying address packet should be conveyed in BC mode, the address switch may modify the routing prefix to indicate the BC mode (e.g., by setting DID7–DID0 to a value that indicates that all devices are destination devices of the accompanying address packet).

In some embodiments, certain routing prefixes generated by client devices may not be transformed by first stage address switches in multi-stage address networks. Accordingly, first stage address switches may be configured to selectively modify routing prefixes depending on the information already included in the routing prefixes conveyed on the address network. In one embodiment, processing subsystems may generate routing prefixes similar to the prefix shown in FIG. 4C when initiating coherency transactions. These routing prefixes may correspond to either PTP-mode request packets or BC-mode packets. Subsequent address packets in PTP-mode transactions may be generated by other processing subsystems and memory subsystems. These address packets, which may correspond to multicasts and responses, may have routing prefixes similar to the prefix shown in FIG. 4D. When an address switch receives a prefix that already includes transmission mode information, a first stage address switch may be configured to not modify that routing prefix. The presence or lack of the transmission mode information may be determined by the address prefix type (e.g., routing prefixes with address prefix type values indicating response and multicast packets may not be modified, while routing prefixes with address prefix type values indicating request or broadcast packets may be modified). Alternatively, the presence or lack of the transmission mode information may be determined by the type of client (e.g., processor, memory, or I/O) that sent the address prefix. Address switches in subsequent stages of the address network may not modify routing prefixes in many embodiments. These address switches may assume that the routing prefix indicates the transmission mode and/or destination ID instead of address information.

Figure 5:
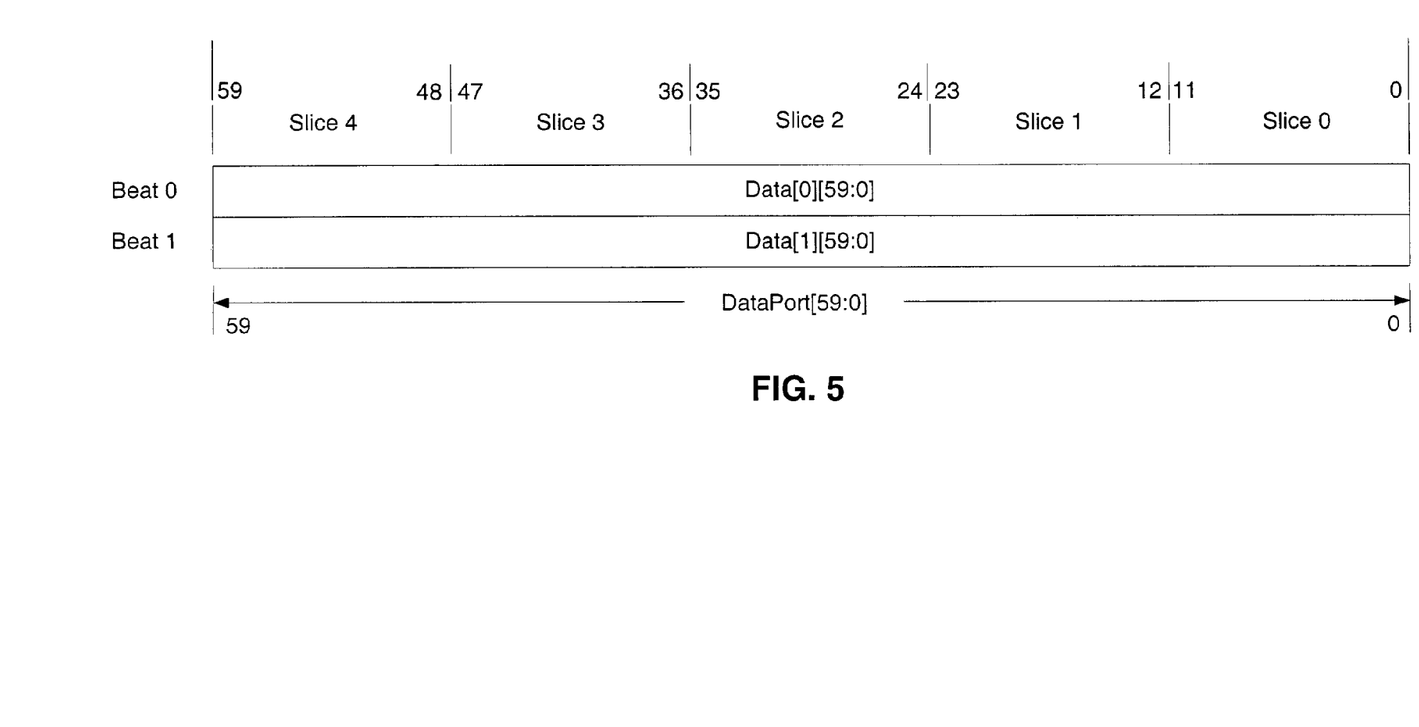
FIG. 5 is a diagram of how a data packet may be conveyed upon a data interconnect in one embodiment.

FIG. 5 illustrates how a data packet may be conveyed between clients and data switches on the data network in one embodiment. In some embodiments, data packets of different lengths may be sent out over the data network. For example, in some embodiments, either "short" data packets or "long" data packets may be sent. In one such embodiment, short data packets may be 120 bits in size and long data packets may be 720 bits in size. It is noted that in other embodiments, other types of data packets may be used that include other numbers of bits and other formats. Furthermore, some embodiments may restrict packets to a single length, while other embodiments may support multiple packet lengths or even variable packet lengths.

Similar to the address packets described above, data packets sent from a client to a data switch or from a data switch to another data switch may be preceded by a routing prefix. However, since client devices do not need to route received packets, data packets sent from a data switch to a client may not be preceded by a routing prefix. Thus, data switches may be configured to remove or otherwise inhibit the sending of data packet routing prefixes to client devices.

Similar to the address packet shown in FIG. 3, a 120-bit short data packet may include a 74-bit short data body, a five-bit packet class, 17 error code bits, and 24 parity bits. A 720-bit long data packet may include a 576-bit long data body, an eight-bit packet class, 30 error code bits, and 144 parity check bits. The parity bits of the data packets may be calculated in a manner similar to the calculation for an address packet.

In FIG. 5, a short data packet is being sent from a data switch to a client. Accordingly, the short data packet is not preceded by a routing prefix. FIG. 5 illustrates how the various portions of the short data packet are sent and divided across the slices. Each slice may be conveyed over a corresponding 12-signal link in this embodiment. The data packet is sent out over two beats. During beat zero, the first half of the short data packet [0][59:0] is sent. During beat one, the second half of the short data packet [1][59:0] is sent.

In the illustrated embodiment, slices 0–3 may convey data body, packet class, and error code bits, and slice 4 may convey the parity bits associated with the information conveyed in slices 0–3.

In embodiments that include five network slices, four slices may be used in certain situations. For example, if one slice fails, the network may continue to operate using the remaining four slices. In such situations, client devices may continue to send packets on all five slices (i.e., client devices may be unaware of the network slice failure). However, the information sent on the bad slice may effectively be ignored by packet recipients. If the bad slice is used to convey information other than the redundant information, that information may be regenerated at each receiving device through use of the redundant information. In other embodiments, client devices may be aware of network slice failures and actively adjust which portions of a packet are sent on each non-failed slice in response to a failure. Accordingly, if one slice fails, the client devices may not send any information on the failed slice in response to a failure being detected. For example, if slice 2 fails, the client devices may be configured to send non-redundant data that would otherwise have been conveyed on slice 2 on the slice normally used to convey redundant data.

Note that other embodiments may slice a packet differently (e.g., into different numbers of slices or into slices that include both redundant and non-redundant information) than described above and/or use a different number of network slices to transmit each packet. For example, each packet may be subdivided into eight slices and eight network slices may be used to convey each packet.

Packet Error Detection and Correction

Using a combination of the parity bits and the error code bits in a packet, client devices may detect and/or correct certain classes of errors within a packet. Client devices may also detect errors within a slice and, based on these errors being detected, a slice may be identified as faulty and shut down (e.g., by a service processor 25). In addition, once a slice is shut down, a slice may be brought back online with the intervention of a service processor 15 or other processor device, such as processor devices 20 of FIG. 1.

Figure 6:
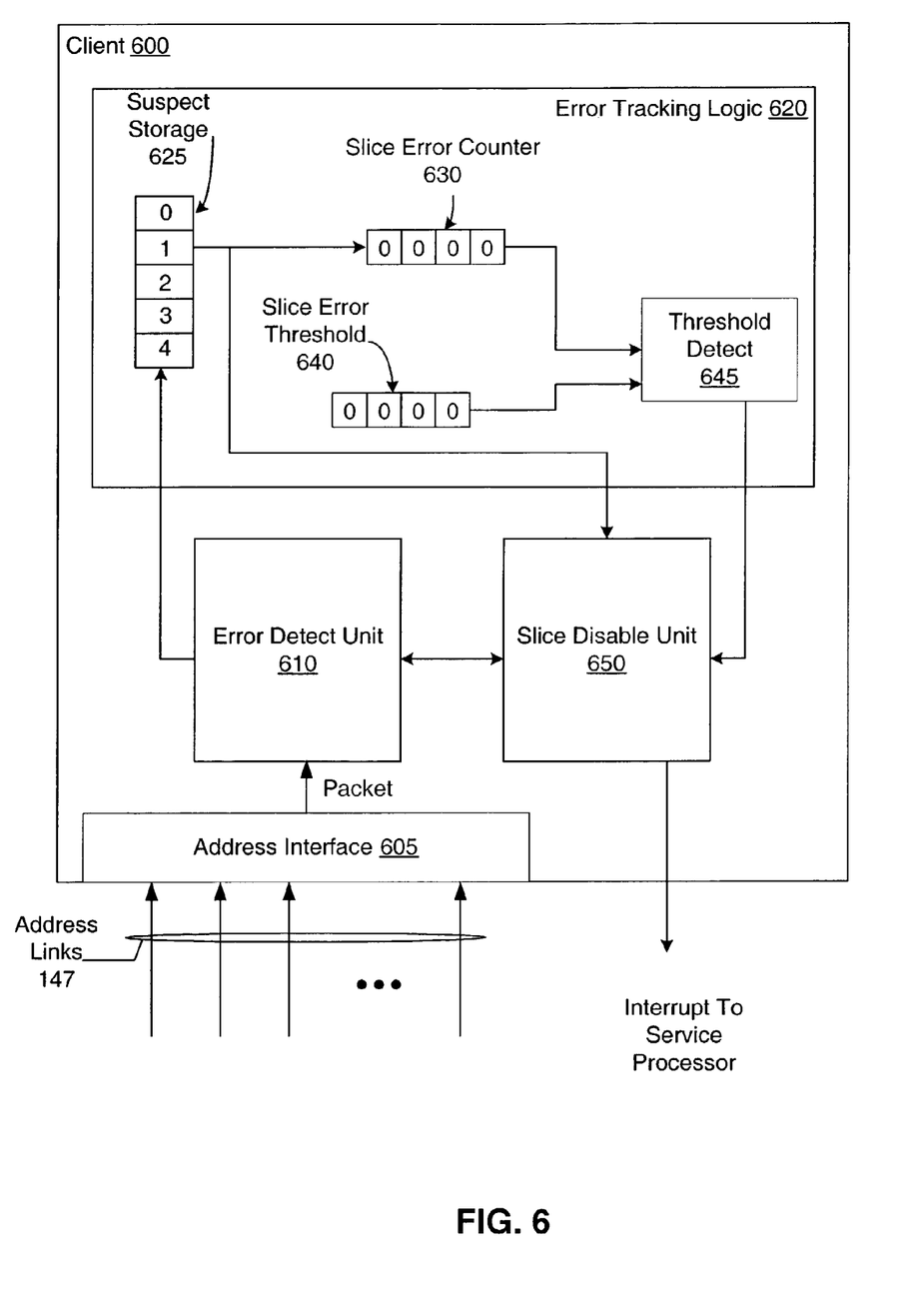
FIG. 6 is a block diagram of a client device, according to one embodiment.

FIG. 6 shows a client device (e.g., a processor device 20, an I/O client, or a memory client 21), according to one embodiment. Client device 600 includes an address interface 605 coupled to receive packets from address links 147. Client device 600 also includes error detection and/or correction unit 610, which is coupled to an error tracking circuit 620, and a slice disable unit 650, which is coupled to error tracking circuit 620 and to error detection and/or correction unit 610. Note that client device 600 may also include a data interface (not shown) to the data network 50. The client device may include multiple error detection and/or correction units 601, error tracking circuits 620, and/or slice disable units 650 in some embodiments (e.g., a separate set of these units may be included for each address and/or data interface in one embodiment).

Error detection/correction unit 610 is configured to determine if any errors exist in a received packet using the error code bits and/or redundant information transmitted with the packet. For example, if the redundant information in one slice is created by XORing other slices of the packet, error detection/correction unit 610 may verify that the redundant information in that slice is the XOR of the other slices of the packet. Similarly, error detection/correction unit 610 may verify that each of the error code bits is the XOR of a respective set of bits within the packet.

In some embodiments, when a packet is received, error detection/correction unit 610 may check for errors within the packet by using the redundant information to create multiple versions of the received packet. One version may be created for each non-redundant slice in the network. For example, in embodiments in which the network includes five slices (four for non-redundant information and one for redundant information), four versions may be made. In each of the different versions, a different non-redundant slice is assumed incorrect and the information in the assumed incorrect slice is recreated using the remaining packet slices and the redundant information.

Once the different versions are created, error detection syndromes may be generated for each new version and for the original using the error code bits included in each slice. Generally, a syndrome is an error code resulting from an XOR operation between a received error code that was transmitted with the information and an error code regenerated from the received information. If there are no errors in the received packet, the syndromes of the original and of the four newly created versions will have the same value (typically zero), and the original packet may be processed.

If there are errors in the received packet, then the syndrome for the original and the syndrome for each different version that still has remaining errors may indicate the error(s), depending on whether the error(s) are within the class of errors that the error code is designed to detect/correct. In one embodiment, the error code may be designed to correct any single bit error and to detect double bit errors. When a single bit error in a slice is detected, only one of the different versions of the packet may have a syndrome indicating no errors are detected. For example, the received packet may have a single bit or double bit error in the bit positions within slice one. Once the packet is copied and the syndromes checked, only the version of the packet that was created by assuming slice one was bad should have a syndrome indicative of no errors, since slice 1 would have already been recreated and replaced from the information in the other slices. Accordingly, that version of the packet may be the one that is processed within client device 600.

A possibility does exist that more than one and fewer than all of the different versions may have a syndrome indicative of no errors due to more than one slice having errors. In this case, an uncorrectable condition may have occurred. In response to detecting an uncorrectable error, client 600 may stop processing packets and send an interrupt to service processor 25 to determine the cause of the error condition.

In an alternative embodiment in which each error code bit's value is only dependent on the values of other bits within the same packet slice, the syndromes of each packet slice within the packet may be calculated when a packet is received (as opposed to automatically creating several different versions of the packet by assuming that different slices are bad). If each syndrome indicates that its respective packet slice is error free, the packet may be processed. If any syndromes indicate that an error is present, then one or more errors may be present in the packet. In one embodiment, the error code may be designed and arranged such that it may detect and correct a single bit error in the packet slice with which it is associated. If the error is a single bit error, the error code may correct the error and the packet may be processed.

The error code may also detect any double bit error, either in any one slice or in different slices. If the error is a double bit error and both erroneous bits are within the same slice, the erroneous slice may be recreated using the redundant information included in the packet and the information in the remaining slices. After the slice is recreated, the syndromes may be recalculated. If the syndromes indicate that no errors are detected, the packet may be processed. It is noted that in other embodiments, the error code may be designed to detect and correct other classes of errors.

In one embodiment, if an uncorrectable error is detected in more than one different slice, then client 600 may stop processing packets and send an interrupt to the service processor 25 to determine the cause of the error condition.

Errors may be introduced by many different sources. For example, transient events, such as noise or voltage spikes, may cause bit errors. In addition, non-transient events or hard failures, such as a connector or wire going bad, may cause repeated errors. While transient errors may be corrected on-the-fly and packets may continue to be processed, hard failures may require system servicing. Normally, the chances may be relatively small that two network slices will encounter errors while conveying the same packet. However, if information conveyed over one particular slice repeatedly has errors, the chances may increase that two slices may suddenly have errors that corrupt different packet slices within the same packet.

To minimize the chance of two slices having an error on a given packet, client 600 may track repeated errors from a given network slice and may cause a slice to be disabled (e.g., by notifying service processor 25, which may in turn disable a malfunctioning network slice) if it becomes unreliable. Client 600 may include error tracking logic 620 in order to identify network slices in which one or more errors have been detected. In response to detecting an error in a slice, error detection/correction unit 610 may provide an indication of the error detection to error tracking logic 620.

In this embodiment, error tracking logic 620 includes a suspect storage unit 625, a slice error counter 630, a slice error threshold storage 640, and a threshold detect circuit 645. Suspect storage unit 625 is configured to provide storage for an error indication. The first time an error occurs in a slice, a corresponding indication identifying the slice on which the error was detected may be stored within suspect storage unit 625. If another error is detected in a different slice, then a corresponding error indication may be, stored within suspect storage unit 625 and the previous indication for the other slice may be removed. Thus, in one embodiment, one slice may be "pointed to" or otherwise identified as an erroneous slice at a given time.

In one embodiment, each time a new packet is received, if an error is present in a given slice, an error indication may be stored within suspect storage unit 625 and if there no errors present in any slice, then any error indications may be removed from suspect storage unit 625. In an alternative embodiment, suspect storage unit 625 may retain an error indication until an error indication for a different slice is stored, causing the current error indication to be removed. In one embodiment, suspect storage unit 625 may be implemented as a register having a corresponding bit position for each slice. In such an embodiment, a bit may be set or cleared to indicate that a given slice has an error. It is noted that other embodiments may employ other types of storages. Furthermore, some embodiments may maintain error indications for a particular slice after an error in a different slice is detected.

Once an error indication for a given slice is stored within suspect storage unit 625, if a subsequent error is detected in that same slice while that slice is being pointed to, then slice error counter 630 is incremented. In the illustrated embodiment, slice error counter 630 is four bits and may be incremented to a count of 15 before rolling over to zero. Other embodiments are contemplated which may include a counter having other numbers of bits. Furthermore, in one embodiment, a different slice error counter 630 may be included for each slice.

Slice error threshold 640 is a storage configured to hold a value indicative of the number of errors that may be detected in a slice before that slice is declared unreliable or bad. In one embodiment, slice error threshold 640 may be a programmable register, although other types of storage are contemplated.

Threshold detect 645 is configured to compare the count value in slice error counter 635 with the threshold value stored within slice error threshold 640. If the two values are equal, threshold detect 645 may provide a threshold match signal to slice disable unit 650.

Slice disable unit 650 is configured to provide an interrupt to a service processor 25 in response to receiving a threshold match signal from threshold detect 645. In addition, slice disable unit 650 may configure client 600 to ignore any further information transmitted on the bad slice. In one embodiment, slice disable unit 650 may also store status information about the bad slice for use by the service processor 25.

Although in one embodiment client 600 includes particular functional units to keep track of a suspect slice and to disable a slice having repeated errors, it is noted that other embodiments are contemplated that may employ other hardware and/or software that functions in the manner described above.

Note that the terms "asserted," "deasserted," "set," and "cleared" are used herein to refer to logical levels of a signal. The actual electrical level of a signal may vary depending on the implementation (e.g., depending on whether active-high or active-low signals are implemented).

Numerous variations and modifications will become apparent to those skilled in the art once the above disclosure is fully appreciated. It is intended that the following claims be interpreted to embrace all such variations and modifications.

What is claimed is:

1. A computer system, comprising:
    a client subsystem;
    an other client subsystem; and
    a network coupled to the client subsystem and the other client subsystem and including a plurality of network slices;
    wherein the client subsystem is configured to convey a packet to the other client subsystem by conveying each of a plurality of slices of the packet on a respective one of the plurality of network slices;
    wherein the client subsystem is further configured to convey redundant information associated with the packet on at least one additional slice of the plurality of network slices, wherein the redundant data is usable to regenerate at least one of the plurality of slices of the packet.

2. The computer system of claim 1, wherein the packet includes an associated error code, wherein the client subsystem is configured to generate the associated error code from a body portion of the packet to provide error protection for the body portion of the packet.

3. The computer system of claim 2, wherein the associated error code is an error correction code.

4. The computer system of claim 2, wherein the other client subsystem is configured to detect an error in the packet using the associated error code.

5. The computer system of claim 2, wherein the packet includes X slices, wherein in response to receiving the packet via the network, the other client subsystem is configured to generate X additional versions of the packet, wherein the other client subsystem is configured to generate each of the X additional versions by using the redundant information to regenerate a respective one of the X slices;
   wherein the other client subsystem is configured to use the associated error code to verify the packet and the X additional versions of the packet;
   wherein if the other client subsystem verifies that only one of the packet and the X additional versions of the packet is an error free version, the other client subsystem is configured to process the error free version.

6. The computer system of claim 1, wherein the other client subsystem is configured to recreate at least one of the plurality of slices of the packet using the redundant information conveyed in the at least one additional slice.

7. The computer system of claim 1, wherein the network is an address network, wherein the client subsystem is configured to send the packet on the address network to initiate a coherency transaction, and wherein the packet includes an address of a coherency unit targeted by the coherency transaction.

8. The computer system of claim 1, wherein the client subsystem is a processor subsystem including at least one processor.

9. The computer system of claim 1, wherein the client subsystem is a memory subsystem.

10. The computer system of claim 1, wherein the client subsystem is an input/output subsystem.

11. The computer system of claim 1, wherein the client subsystem is configured to generate the redundant information by computing a parity of the plurality of packet slices.

12. The computer system of claim 1, wherein the network is an address network, the computer system further comprising a data network that includes a plurality of data network slices;
   wherein the client subsystem is configured to convey a data packet to the other client subsystem via the data network by conveying each of a plurality of data packet slices in a respective one of the plurality of data network slices;
   wherein the client subsystem is configured to convey redundant information associated with the data packet to the other client subsystem in at least one additional slice of the plurality of data network slices.

13. The computer system of claim 12, wherein the data packet includes an error detection code generated by the client subsystem from a body portion of the data packet.

14. The computer system of claim 12, wherein the other client subsystem is configured to recreate at least one of the plurality of data packet slices using the redundant information included in the at least one additional data network slice.

15. A method, comprising:
   a client subsystem conveying each of a plurality of packet slices via a respective one of a plurality of network slices coupling the client subsystem to an other client subsystem;
   the client subsystem conveying redundant information associated with the plurality of packet slices via at least one additional one of the plurality of network slices;
   the other client subsystem using the redundant information to regenerate at least one of the plurality of packet slices.

16. The method of claim 15, wherein the plurality of packet slices includes an error code generated from a body portion of the plurality of packet slices.

17. The method of claim 16, further comprising the other client subsystem using the error code to verify the body portion of the plurality of packet slices.

18. The method of claim 16, wherein the error code is an error correction code.

19. The method of claim 16, further comprising the other client subsystem generating N additional versions of the plurality of packet slices, wherein the plurality of packet slices includes X slices, wherein said generating includes generating each of the X additional versions by using the redundant information to regenerate a respective one of the X slices;
   the other client subsystem using the associated error code to verify the plurality of packet slices and the X additional versions of the plurality of packet slices;
   if only one of the packet and the X additional versions of the packet is an error free version, the other client subsystem processing the error free version.

20. The method of claim 15, wherein the network is an address network, wherein said conveying initiates a coherency transaction for a coherency unit identified by an address included in the plurality of packet slices.

21. The method of claim 15, wherein the client subsystem is configured to generate the redundant information by computing a parity of the plurality of packet slices.

22. A system, comprising:
   a client device;
   an other client device;
   a network coupled to the client device and the other client device, wherein the network includes a plurality of network slices, wherein each of the plurality of network slices is a plurality of bits wide;
   wherein the client device is configured to convey a packet to the other client device via the plurality of network slices by sending each of a plurality of different portions of the packet on a respective one of the plurality of network slices;
   wherein at least one of the plurality of different portions of the packet includes redundant information usable to regenerate at least one other one of the plurality of different portions of the packet.

23. The system of claim 22, further comprising a plurality of network switches, wherein each of the plurality of network switches is coupled to a respective one of the plurality of network slices.

24. The system of claim 22, wherein the packet includes an associated error code, wherein the client subsystem is configured to generate the associated error code from a body portion of the packet to provide error protection for the body portion of the packet.

25. The system of claim 24, wherein the associated error code is an error correction code.

26. The system of claim 24, wherein the other client subsystem is configured to detect an error in the packet using the associated error code.

27. The system of claim 24, wherein the packet includes N different portions and wherein the redundant information is included in a single one of the N different portions, wherein in response to receiving the packet via the network, the other client subsystem is configured to generate N−1 additional versions of the packet, wherein the other client subsystem is configured to generate each of the N−1 additional versions by using the redundant information to regenerate a respective one of the N−1 different portions that do not include the redundant information;

wherein the other client subsystem is configured to use the associated error code to verify the packet and the N−1 additional versions of the packet;

wherein if the other client subsystem verifies that only one of the packet and the N−1 additional versions of the packet is an error free version, the other client subsystem is configured to process the error free version.

28. The system of claim 22, wherein the other client subsystem is configured to recreate at least one of the plurality of different portions of the packet using the redundant information.

29. The system of claim 22, wherein the network is an address network, wherein the client subsystem is configured to send the packet on the address network to initiate a coherency transaction, and wherein the packet includes an address of a coherency unit targeted by the coherency transaction.

* * * * *